US008515702B2

(12) United States Patent
Daw et al.

(10) Patent No.: US 8,515,702 B2
(45) Date of Patent: Aug. 20, 2013

(54) SYSTEMS AND METHODS FOR DETERMINING LOCATIONS OF BURIED OBJECTS

(75) Inventors: Justin Daw, Olmsted Township, OH (US); Jay Gatz, Avon Lake, OH (US)

(73) Assignee: Emerson Electric Co., St. Louis, MO (US)

(*) Notice: Subject to any disclaimer, the term of this patent is extended or adjusted under 35 U.S.C. 154(b) by 363 days.

(21) Appl. No.: 12/944,849

(22) Filed: Nov. 12, 2010

(65) Prior Publication Data

US 2011/0112787 A1    May 12, 2011

Related U.S. Application Data

(60) Provisional application No. 61/260,674, filed on Nov. 12, 2009.

(51) Int. Cl.
*G06F 19/00* (2011.01)
(52) U.S. Cl.
USPC ............................................................ 702/95
(58) Field of Classification Search
USPC .................. 702/95, 182–185, 188
See application file for complete search history.

(56) References Cited

U.S. PATENT DOCUMENTS

| 5,056,454 A | 10/1991 | Turner |
| 7,518,374 B1 | 4/2009 | Olsson et al. |
| 7,755,360 B1 * | 7/2010 | Martin ........................ 324/326 |

OTHER PUBLICATIONS

"McLaughlin Introduces GPS-Enabled Utility Locator", www.mightymole.com Feb. 18, 2010.

* cited by examiner

*Primary Examiner* — Edward Raymond

(57) ABSTRACT

A method is provided for reporting location of a buried object detected by a utility locator device. The method includes: determining location of a buried object using electromagnetic field emissions emitted from a utility locator device, determining global coordinates for the location of the buried object using a global positioning system (GPS), determining an accuracy measure for the global coordinates using the accuracy of the location determined by the locator and the accuracy of the GPS; and reporting the global coordinates for the buried object, along with the accuracy measure, to an operator of the utility locator device. An operator of the locator may be notified when the accuracy measure for the global coordinates exceeds a tolerance for reporting the location of the buried object.

24 Claims, 7 Drawing Sheets

SYSTEMS AND METHODS FOR DETERMINING LOCATIONS OF BURIED OBJECTS

CROSS-REFERENCE TO RELATED APPLICATIONS

This application claims the benefit of U.S. Provisional Application No. 61/260,674, filed on Nov. 12, 2009. The entire disclosure of the above application is incorporated herein by reference.

FIELD

The present disclosure relates to systems and methods for reporting location of a buried object detected by a portable utility locator device.

BACKGROUND

A pipe, cable, ferro magnetic and/or sonde locator (hereinafter "locator") is a diagnostic tool that detects electromagnetic (EM) fields emitted by buried objects. A user determines the location of buried objects based on characteristics of the EM fields emitted by the buried objects. For example, the user may determine the location of buried power lines based on detection of EM fields emitted by the power lines. Some buried objects do not emit EM fields. Accordingly, the user may excite a buried object at a predetermined frequency to emit EM fields using a line transmitting device. Using the locator, the user then detects the EM fields emitted by buried objects excited at the predetermined frequency.

The user typically generates a report detailing the location of buried objects found at a jobsite. For example, the report may include a mapping of the buried objects overlaid on a map of the jobsite. The report may also include photos to document markers laid along the identified path or to record marks and/or paint left on the ground. The report may be used at a later time to locate the buried objects prior to digging at the jobsite. It is important that the report includes an accurate mapping of the buried objects in order to allow for a successful dig. Accordingly, it is desirable to report the locations of the buried objects accurately and quantify the accuracy of the locations in the report.

This section provides background information related to the present disclosure which is not necessarily prior art.

SUMMARY

A method is provided for reporting location of a buried object detected by a utility locator device. The method includes: determining location of a buried object using electromagnetic field emissions emitted from a utility locator device, determining global coordinates for the location of the buried object using a global positioning system (GPS), determining an accuracy measure for the global coordinates using the accuracy of the location determined by the locator and the accuracy of the GPS; and reporting the global coordinates for the buried object, along with the accuracy measure, to an operator of the utility locator device. An operator of the locator may be notified when the accuracy measure for the global coordinates exceeds a tolerance for reporting the location of the buried object.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

BRIEF DESCRIPTION OF DRAWINGS

The present disclosure will become more fully understood from the detailed description and the accompanying drawings.

DETAILED DESCRIPTION

A system is provided for reporting the location of buried or otherwise concealed objects detected by a portable locator device. The system is comprised of a portable locator device that detects location of an object using electromagnetic field emissions and a global positioning system (GPS) affixed in relation to the locator. A link application is configured to receive the location of the object from the locator and the global coordinates for the locator from the GPS and adjust the global coordinates for the locator using the location of the buried object reported by the locator to derive global coordinates for the location of the buried object. The link application may be further configured to determine an accuracy measure for the global coordinates for the location of the buried object using the accuracy measure for the location and the accuracy measure for the global coordinates for the locator. Various embodiments of the system are further described below.

Figure 1:
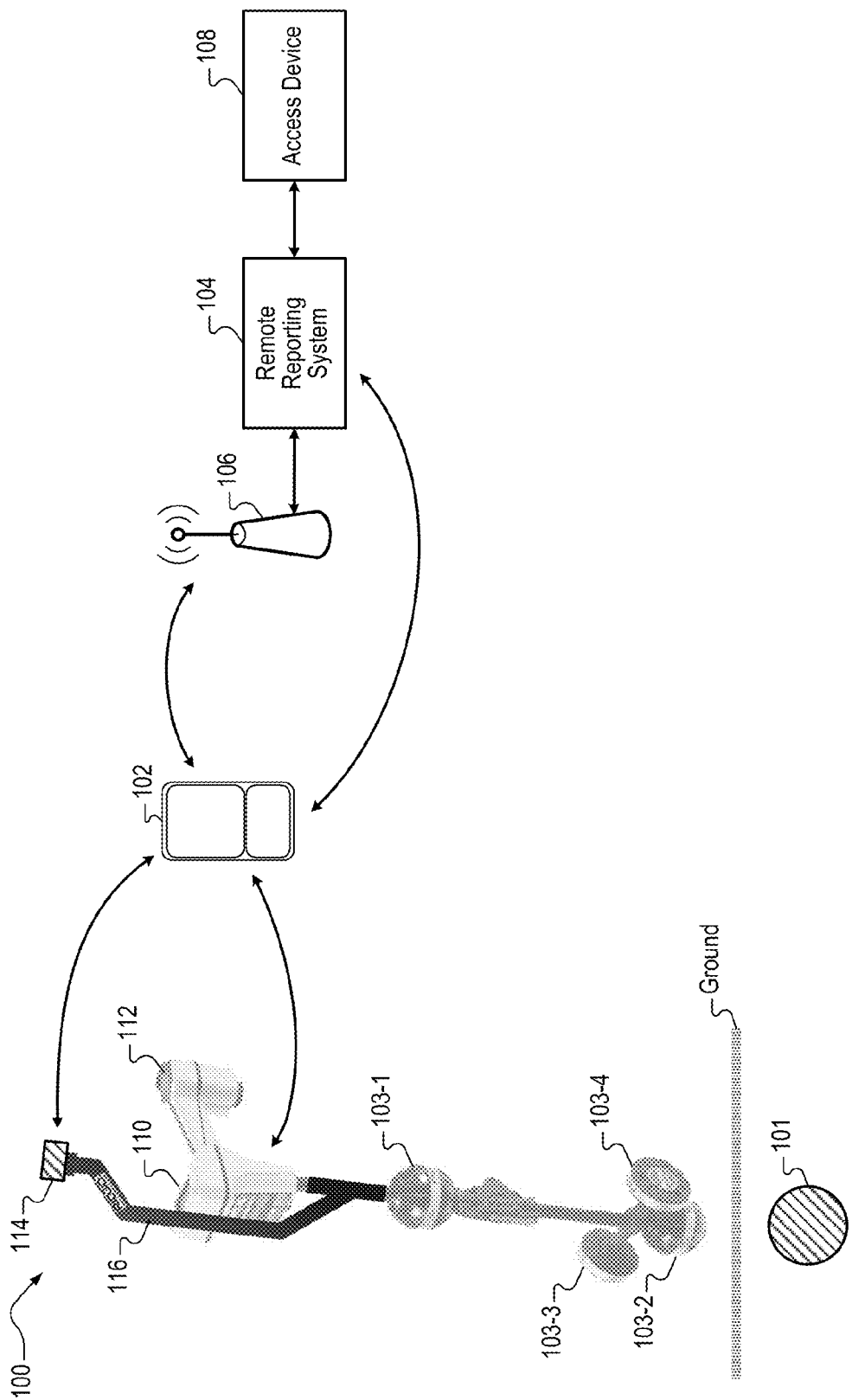
FIG. 1 illustrates a system that logs data associated with buried objects using a handheld device according to the present disclosure.

FIG. 1 depicts a system reporting the location of buried or otherwise concealed objects detected by a portable locator device 100. For example, buried objects may include underground utilities such as underground power lines, gas lines, phone lines, fiber optic cable conduits, CATV cables, sprinkler control wiring, water pipes, sewer pipes, cleanouts, personal sewer laterals, transmission pipe lines, etc. Buried objects may also include objects located inside walls, between floors, or cast in concrete slabs. In an exemplary embodiment, the locator may be a modified version of a RIDGID® SeekTech SR-20 locator or a RIDGID® SeekTech SR-60 locator commercially available from Ridge Tool Company. Locators from other sources are also contemplated by this disclosure.

In the exemplary embodiment, the locator determines the location of an object using electromagnetic field emissions detected by electromagnetic EM field sensor assemblies 103-1, 103-2, 103-3, and 103-4 (collectively "sensors 103"). More specifically, the locator 100 determines a depth of the buried object 101 based on signals received from the sensors 103. The locator 100 further determines additional directional data for the buried object. For example only, the locator 100 may determine that the buried object is located 3 feet to the left of the locator 100. Thus, the locator is able to determine the location of the object in relation to the locator. As the locator traverses over a surface, the locator 100 can determine a path of the buried object 101, including an approximate axis of the buried object 101. The signals received from the sensors 103 that indicate the depth, location, and path of the buried object 101 may be referred to hereinafter as "locator data". Operation of the exemplary locator is further described in U.S. Pat. No. 7,518,374, titled "Reconfigurable Portable Locator Employing Multiple Sensor Array Having Flexible Nested Orthogonal Antennas", which is incorporated herein by reference in its entirety. While the locator 100 is described as a device that detects EM fields emitted by buried objects, in other implementations, the locator 100 may be another type of detection device such as a ferromagnetic locator (e.g., rebar detector), an ultrasound detector, a sonar detector, an ultra wide band detector, a flame ionization gas leak detector, an infrared gas leak detector, a laser-based gas leak detector, a ground penetrating radar, or a detector that detects electronic marker balls.

Locator data may be transferred from the locator 100 to a handheld computing device associated with the operator of the locator 100. In an exemplary embodiment, the handheld device 102 may be one of a BlackBerry® Smartphone (e.g., Touch™ 9800, Bold™ 9700, Storm2™ 9550), an Apple Inc. iPhone™, Android enabled device, Windows mobile device or other mobile devices including similar functionality which are available from various wireless device vendors. In other embodiments, the handheld device 102 may be a portable computing device such as a tablet computer, PDA, a laptop computer, or Windows enabled survey tools, such as a Trimble Recon or Magellan Nomad survey tool. Other types of handheld computing devices are also contemplated by this disclosure.

The locator 100 communicates with the handheld device 102 using a wired and/or wireless connection. Accordingly, the locator 100 transfers locator data to the handheld device 102 using the wired and/or wireless connection. For example only, the wired connection may include a universal serial bus (USB) and the wireless connection may operate using various wireless protocols (e.g., Bluetooth™). A display on the handheld device 102 displays real-time feedback of the locator data received from the locator 100 to the user while the user is locating the buried object 101. The handheld device 102 may store the data received from the locator 100 in a data store residing on the handheld device 102. If the device is connected to a data network, it could stream data from the device to a hosted service where third parties could view the data in real time.

A global positioning system (GPS) is affixed in relation to the locator 100. Different GPS devices having various accuracies may be attached to the locator 100. As the accuracy of GPS devices increases and the associated costs decrease in the future, the GPS device 114 may be updated. In an exemplary embodiment, the GPS device 114 detachable couples to an adapter 116 on the locator 100. The GPS device 114 is preferably aligned with a vertical axis of the coordinate system in which the locator reports locator data (e.g., the longitudinal axis of the locator). Rather than being aligned with the vertical axis, the GPS device 114 could be offset from the vertical axis. In this case, the offset position between the adapter 116 (i.e., the GPS device 114) and the vertical axis could be determined and stored for measurement corrections as further described below. The adapter 116 may also be telescopic, meaning that the length of the adapter 116 may be adjustable. Accordingly, the adapter 116 may be extended and retracted to change a distance of the GPS device 114 from the housing 110. The adapter 116 may be extended, for example, to allow for clearer reception of satellite signals by the GPS device 114. While the GPS device 114 is shown as connected to the locator 100 using an adapter 116 in FIG. 1, the GPS device 114 may reside in the housing 110 in other implementations.

The GPS device 114 reports the position of the locator 100. More specifically, the GPS device 114 determines latitude, longitude, and altitude information indicating the position of the locator 100. The GPS device 114 may also report a time corresponding to when the latitude, longitude, and altitude information was acquired. The latitude and longitude data may collectively be referred to as "global coordinates".

The GPS device 114 also determines an accuracy associated with the determined latitude, longitude, and altitude information. In an exemplary embodiment, the accuracy of the GPS device 114 may be expressed in terms of distance (e.g., feet or meters). The latitude, longitude, altitude, time, and accuracy information determined by the GPS device 114 may hereinafter be referred to as "GPS data." The GPS data may be wirelessly transfer from the GPS device 114 to the handheld device 102.

The handheld device 102 may communicate with a remote reporting system 104 using a cellular network 106 or some other type of wireless communication link. The remote reporting system 104 may include a database that stores data received from the handheld device 102. Accordingly, the handheld device 102 may transfer stored locator data and/or the GPS data to the remote reporting system 104 using the cellular network 106. Alternatively, the handheld device 102 may transfer stored locator data and/or the GPS data to the remote reporting system 104 using various wired (USB) and/or wireless (Bluetooth™) protocols.

Users may access the data stored in the remote reporting system 104 in order to generate written reports. The written reports may include the location of buried objects and measurement tolerances associated with the buried objects. Data stored in the remote reporting system 104 may be accessed by users using an access computing device or internet appliance 108. Users may also access the data stored in the remote reporting system 104 using a handheld device having similar functionality to the handheld device 102 described herein. For example, a user may access the remote reporting system 104 using a handheld device in order to generate a map of buried objects and measurements tolerances on a display of the handheld device. A system for storing data and generating reports associated with measurements at a jobsite is described in U.S. patent application Ser. No. 12/275,849, titled "System for Sharing Video Captured at Jobsite," which is incorporated herein by reference in its entirety.

Figure 2:
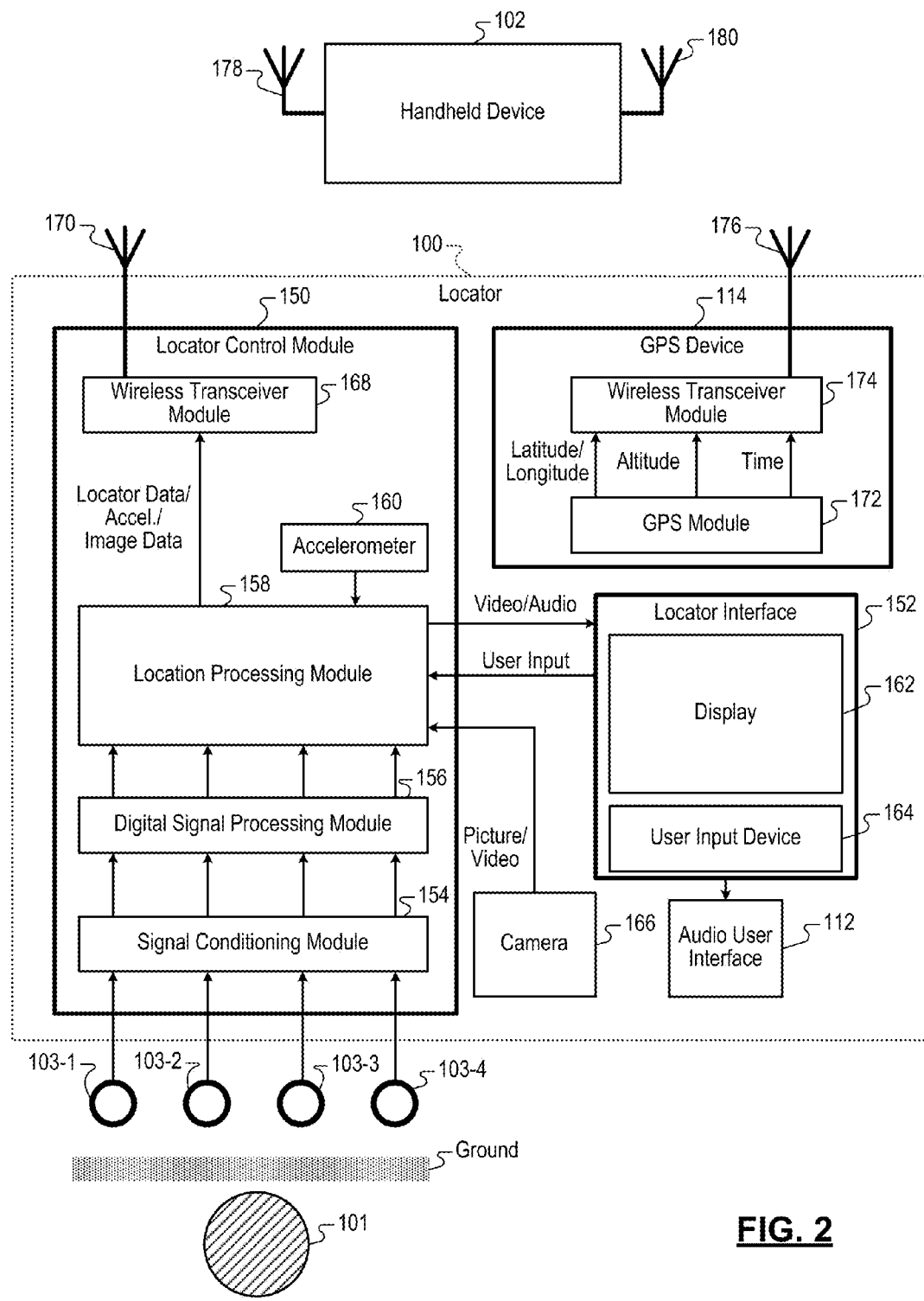
FIG. 2 is a functional block diagram of components of a locator according to the present disclosure.

An exemplary embodiment of the locator 100 is further described with reference to FIG. 2. The locator 100 may include a locator control module 150, a GPS device 114, and a locator interface 152. The locator control module 150 includes a signal conditioning module 154 that conditions signals received from the sensors 103, for example, using a preamplifier circuit. The signal conditioning module 154 may also convert the signals received from the sensors 103 into digital values. A digital signal processing module 156 processes the signals from the sensors 103 after the signals are conditioned by the signal conditioning module 154. A location processing module 158 determines the locator data based on the signals received from the digital signal processing module 156. For example, the location processing module 158 may determine an EM field vector magnitude associated with each of the sensor signals. Processing and conditioning of signals generated by EM sensors is described in U.S. Pat. No. 7,518,374, which is incorporated by reference in its entirety.

The locator interface 152 may include a display 162 for displaying locator data and/or GPS data to the operator of the locator. The display 162 may be a liquid-crystal display (LCD). The locator interface 152 displays, for example, information relating to the buried object 101 (e.g., a location, depth, path), current GPS coordinates, etc. The user interacts with the locator 100 using a user input device 164. For example, the user input device 164 may be a keypad, stylus, touch screen, remote wired or wireless control pad, or speech recognition. Other types of user interface components may also be integrated into the locator, such as an audio output device 112.

The locator control module 150 may also include an accelerometer 160. The location processing module 158 determines an orientation of the locator 100 based on signals received from the accelerometer 160. An upright orientation of the locator 100 may be a preferred orientation for measurements since the GPS data corresponds to a position of the sensors 103 when the locator 100 is upright. The accelerometer 160 detects a tilting of the locator 100 away from the upright position, and accordingly may determine when the GPS device 114 is not located over the sensors 103. A greater tilting of the locator 100 detected by the accelerometer 160 may indicate a greater inaccuracy (i.e., misalignment) of the GPS data. In some implementations, the signals generated by the accelerometer 160 may be included in the locator data.

In some implementations, the locator 100 may include an attached camera 166 that captures still images and/or video. Still images and/or video captured by the camera 166 may be referred to hereinafter as "locator image data." The location processing module 158 may receive locator image data from the camera 166. In some implementations, the locator data may include locator image data.

The locator control module 150 includes a wireless transceiver module 168 that transmits and receives data using an antenna 170. The wireless transceiver module 168 transmits data received from the location processing module 158. For example, the wireless transceiver module 168 may transmit the locator data, accelerometer data, and the image data. The wireless transceiver module 168 may transmit data using various wireless protocols (e.g., Bluetooth™).

The GPS device 114 associated with the locator 100 includes a GPS module 172. The GPS module 172 receives GPS signals and determines the GPS data based on the received GPS signals. A wireless transceiver module 174 transmits the GPS data using an antenna 176. The wireless transceiver module 174 may transmit data using various wireless protocols (e.g., Bluetooth™). Alternatively, the GPS module 114 may be configured to interface with wireless transceiver module 168 to transmit GPS data.

In some implementations, the locator control module 150 may receive GPS data from the GPS device 114 using a wireless and/or a wired connection. In this case, the display 162 displays the GPS data when the locator control module 150 receives the GPS data from the GPS device 114.

The handheld device 102 receives the locator data, accelerometer data, and the image data from the locator control module 150 using an antenna 178. The handheld device 102 also receives the GPS data from the GPS device 114 using the antenna 178. The handheld device 102 may communicate with the cellular network 106 using a second antenna 180.

Figure 3:
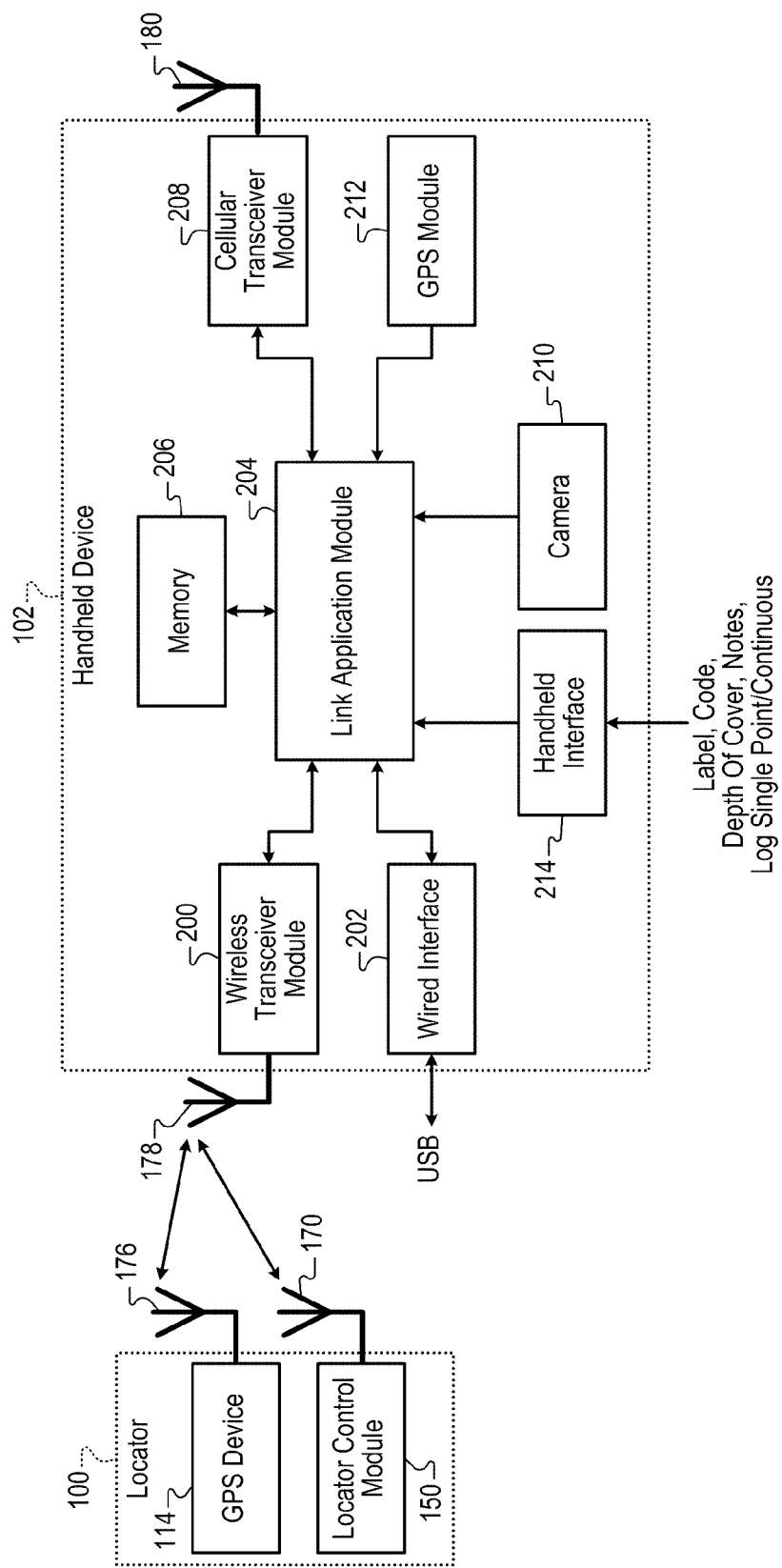
FIG. 3 is a functional block diagram of the handheld device according to the present disclosure.

Referring to FIG. 3, the handheld device 102 includes a wireless transceiver module 200 that receives GPS data from the GPS device 114 and/or locator data over a wireless communication link from the locator control module 150. The handheld device 102 may also include a wired interface 202. For example, the wired interface 202 may include a USB interface. In some implementations, the wired interface 202 is connected to a wired interface of the locator control module 150 and/or the GPS device 114. Accordingly, in some implementations, the handheld device 102 receives GPS data from the GPS device 114 and locator data from the locator control module 150 using a wired connection. The handheld device 102 may also receive data measured at the jobsite from other data sources via a wireless and/or wired connection. For example, the handheld device 102 may receive data from a camera, a laser range finder, or any other wireless or wired device suitable for collecting data at the jobsite.

A link application module 204 receives the locator data and/or the GPS data and stores the data in a non-transitory tangible data store 206, such as a nonvolatile memory, magnetic storage, and optical storage. For example, the memory may include at least one of a dynamic random access memory, a flash memory, and a hard disk drive. The link application module 204 may transfer the data stored in the data store 206 using the wired interface 202 and/or a wireless connection. The link application module 204 may transfer data from the data store 206 to the remote reporting system 104 using the wired interface 202 when the remote reporting system 104 includes a wired connection. The link application module 204 may also transfer the data stored in the data store 206 to the remote reporting system 104 using a cellular transceiver module 208. The cellular transceiver module 208 transfers data to the remote reporting system 104 over a wireless communication link using the second antenna 180.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The handheld device 102 may include a camera 210. The camera acquires still images and/or video. The still images and/or video acquired by the camera 210 may be referred to hereinafter as "handheld image data." The link application module 204 may store the handheld image data in the data store 206. The link application module 204 may store a time stamp in the data store 206 corresponding to when the handheld image data was taken.

The handheld device 102 may include a GPS module 212. The GPS module 212 may operate similarly to the GPS module 172 included in the GPS device 114. Accordingly, the GPS module 212 acquires GPS data. GPS data received from the GPS module 212 may be referred to hereinafter as "handheld GPS data". While the disclosure describes the handheld device 102 as receiving GPS data from the GPS device 114 attached to the locator 100, in some implementations, the handheld device 102 may replace the GPS device 114. For example, the handheld device 102 may be attached in place of the GPS device 114 on the adapter 116 and the handheld GPS data generated by the GPS module 212 may be used instead of the GPS data generated by the GPS module 172. It is envisioned that either the locator 100 and/or the handheld device 102 may determine GPS coordinates using cellular references (e.g., 4G/WiMAX references) or some other position determination method. In other implementations, the GPS module and the link application may be integrated into the housing of the locator.

A user interacts with the handheld device 102 through a handheld interface 214. The handheld interface 214 may include a keypad, a trackball, a scrolling wheel etc. The handheld device 102 may include voice recording and voice recognition software. Accordingly, the handheld device 102 may also receive voice commands, store voice recordings, and convert speech to text. The handheld interface 214 includes a display screen for displaying data. For example, the display screen may be an LCD. The display screen may display at least one of GPS data received from the GPS device 114, locator data received from the locator control module 150, handheld image data received from the camera 210, and handheld GPS data received from the GPS module 212.

Figure 4:
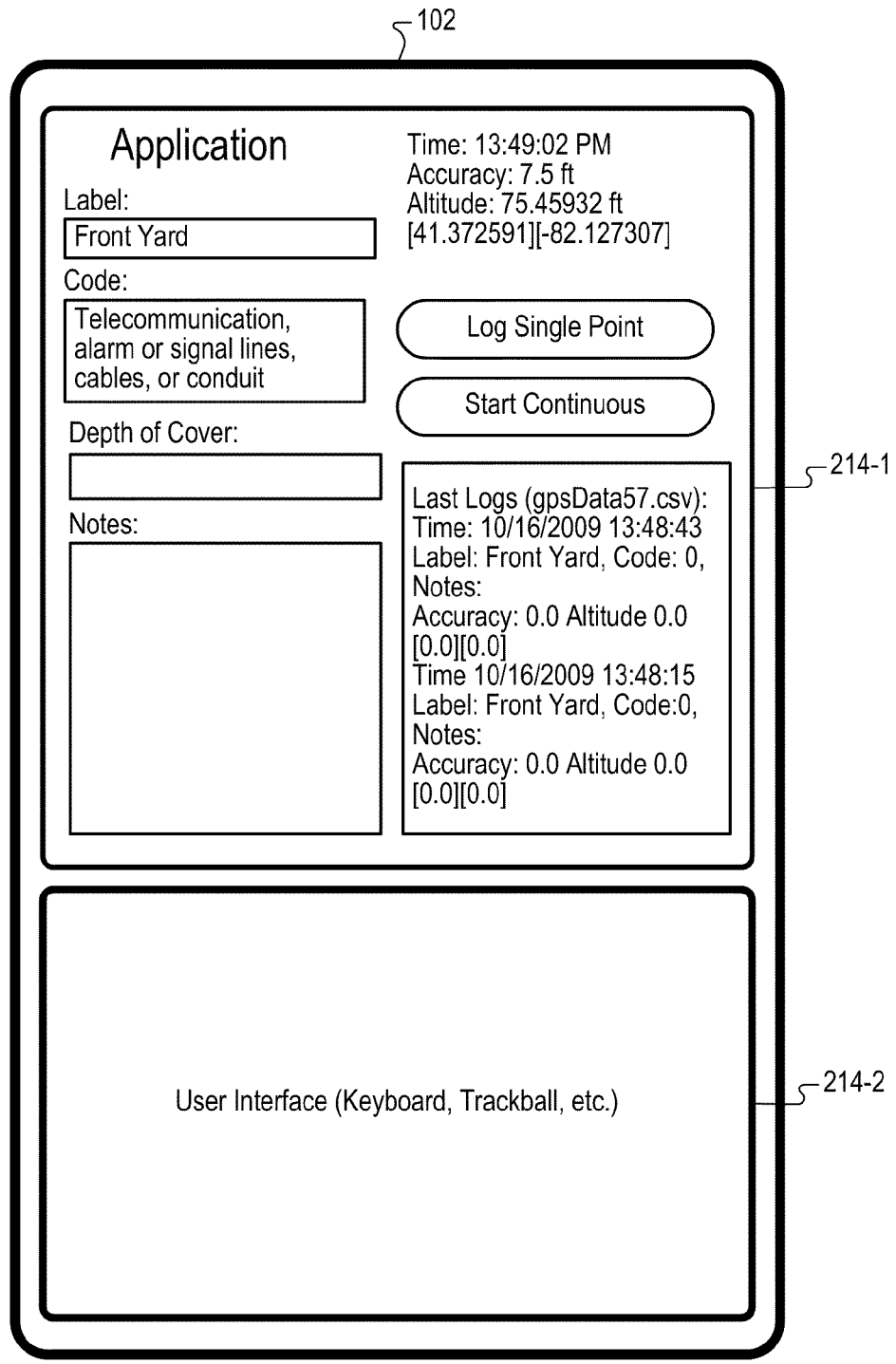
FIG. 4 illustrates an exemplary interface of the handheld device according to the present disclosure.

An exemplary interface 214 is further described in relation to FIG. 4. The user controls and organizes collection of locator data and or GPS data using the handheld interface 214. The handheld interface 214 includes a display area 214-1 and an input area 214-2. The user may label the data to be collected by entering a label name into a "Label:" field. The "Label:" field may indicate a specific point of interest (e.g., a front yard) for which data is to be collected. The user may set a color code corresponding to a type of buried object by entering information in the "Code:" field. Data corresponding to the buried object 101 may be color coded per standard utility identification colors. The user may enter a depth of cover in the "Depth of Cover:" field corresponding to a depth of cover associated with the point of interest. The user may also enter freeform notes related to the worksite in the "Notes:" field. The freeform notes may be based on observation by the user of the point of interest.

During operation, the user chooses a mode of data acquisition by selecting "Log Single Point" or "Start Continuous." The "Log single Point" selection stores a single instance of locator data, GPS data, handheld GPS data, handheld image data, etc. The "Start Continuous" selection logs multiple samplings of locator data, GPS data, image data, etc, into the data store 206. The data may be logged over a period of time (e.g., 30 seconds) or until the user deactivates the data acquisition mode. Data entered into the handheld interface 214 such as a label, notes, a code, and a depth of cover, may be referred to hereinafter as "user interface data." The handheld device 102 stores the user interface data in the data store 206. The user interface data may be stored in the data store 206 with corresponding locator data and GPS data taken in response to the user selecting either "Log Single Point" or "Start Continuous" as described hereinafter.

The handheld device 102 may display data received from the locator control module 150 and/or the GPS device 114. For example, the handheld device 102 may display a current time, a current altitude, a current longitude, and a current latitude and a current accuracy measure of the same. The handheld device 102 may also display previously logged data in a "Last Logs:" field. For example, the handheld device 102 may display a time corresponding to previously logged data along with the previously logged data.

Figure 5:
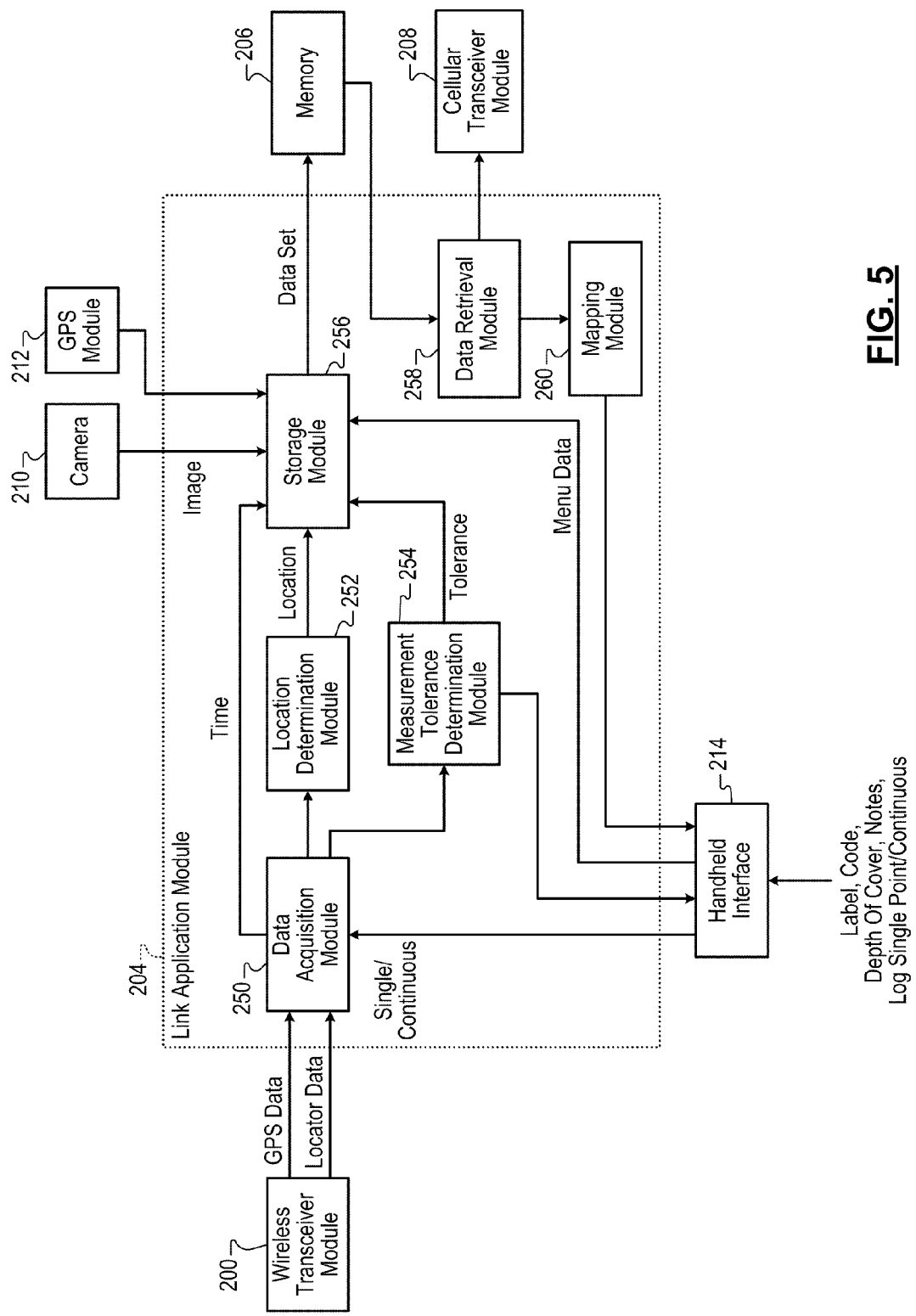
FIG. 5 is a functional block diagram of a link application module according to the present disclosure.

FIG. 5 shows a detailed view of the link application module 204. The link application module 204 includes a data acquisition module 250 that receives the GPS data and the locator data from the wireless transceiver module 200. The data acquisition module 250 requests locator data and GPS data from the locator 100 and GPS device 114, respectively. The requested locator data and GPS data are stored in the data store 206 and may be indexed based on the time the GPS data and the locator data were received. Other data associated with the locator data and the GPS data may also be indexed in the data store 206 according to the time the locator data and GPS data were received. Other data may include data from a camera, a laser range finder, or any other wireless or wired device suitable for collecting data at a jobsite.

The data acquisition module 250 acquires the GPS data and the locator data based on a mode of operation of the handheld device 102. The user selects the mode of operation of the handheld device 102 by selecting one of "Log Single Point" and "Start Continuous" in the handheld interface 214. The data acquisition module 250 acquires one set of data in response to a selection of "Log Single Point" in the handheld interface 214. One set of data may include a single sample of the GPS data, a time corresponding to the GPS data, and a single sample of the locator data. The user interface data and handheld image data captured by the camera 210 may be stored in the data store 206 with the acquired set of data.

The location determination module 252 determines the location that the data was taken based on the GPS data and/or the locator data. The location determination module 252 determines an initial latitude and longitude value associated with the buried object 101 based on the GPS data. The location determination module 252 also determines latitude and longitude adjustment values associated with the received locator data. For example, the latitude and longitude adjustment values correspond to a distance, in terms of an amount of degrees of latitude and longitude, respectively, between the locator 100 and the buried object 101. The location determination module 252 then adjusts the initial latitude and longitude using the adjustment values. For example, the location determination module 252 may adjust the initial latitude and longitude values by adding or subtracting the locator data from the initial latitude and longitude to determine a more accurate location of the buried object. In a more specific example, when the locator data indicates that the locator 100 was offset 3 ft to the east of the buried object 101, the location determination module 252 may determine that the GPS coordinates of the buried object are equal to the initial longitude value minus a 3 ft adjustment to the initial longitude value.

An accuracy determination module 254 determines an accuracy measure associated with the location of the buried object determined by the location determination module 252. The accuracy measure indicates a possible positional error associated with the latitude and longitude determined by the location determination module 252. The accuracy of the measured data is provided to the accuracy determination module by the GPS device 114. For example, the global coordinates determined by of the GPS device 114 may have an accuracy of 1.5 ft. Accordingly, the accuracy measure associated with the location of the buried object 101 due to the GPS device 114 is ±1.5 ft.

The accuracy determination module 254 may also receive an accuracy measure for the location determined by the locator. The locator will report an accuracy measure based on an amount of noise present in the signals received from the sensors 103. The greater amount of noise present in the signals received by the locator, the less accurate the location determination for the object. For example only, the locator 100 may determine the location of the buried object 101 within an accuracy of ±0.5 ft.

The accuracy determination module 254 determines an overall accuracy measure associated with the location of the buried object 101. In an exemplary embodiment, the accuracy determination module 254 adds the accuracy measures from the GPS device 114 and the locator 100 to determine the overall tolerance. For example, when the accuracy of the GPS device 114 and the locator 100 are ±1.5 ft and ±0.5 ft, respectively, the overall accuracy measure may be set to ±2 ft. Accordingly, the location of the buried object 101 may be described by latitude and longitude coordinates, adjusted by locator data, within a margin of error of ±2 ft. This accuracy measure may be reported to the user.

The accuracy determination module 254 may further adjust the global coordinates for the object and/or the accuracy measure based on the spatial orientation of the locator. For example, the accuracy determination module 254 may receive an angle at which the locator is titled from an upright position as determined by the accelerometer. In the case the GPS device 114 is affixed to the locator at a known length from the ground, the distance the GPS device is offset when the locator is titled can be computed (e.g., offset distance=known length*tangent of tilt angle). Other means for determining the offset distance may also be used. Given the offset distance, the accuracy determination module 254 may further adjust the accuracy measure for the global coordinates. The offset distance could also be used to correct the location determination (i.e., GPS coordinates) of the object.

In a best case scenario, a high amount of accuracy is achieved when the GPS device 114 and the locator 100 acquire data including a minimal amount of noise and the accelerometer 160 indicates that the locator 100 is positioned upright. For example, the GPS device 114 may have a measurement tolerance of ±1.25 ft and measurement error associated with the locator 100 may be negligible. In this case, the accuracy determination module 254 may determine the measurement of the location of the buried object 101 is associated with a tolerance of ±1.25 ft In a worst case scenario, a lower amount of accuracy is achieved when the GPS device 114 and the locator 100 acquire data including substantial noise and the accelerometer 160 indicates that the locator 100 is tilted so that the GPS device 114 is not located over the buried object 101. While best and worst case scenarios are presented, it can be envisioned that measurement accuracies may fall within a range of the maximum and minimum accuracy depending on variations in an amount of noise received by the GPS device 114 and/or the locator 100 and the amount of tilt measured by the accelerometer 160.

Accuracy of the measurements taken by the locator 100, the GPS device 114, and the accelerometer 160 affect an accuracy measure associated with the measured location of the buried object 101. In other words, the buried object 101 may be described as a discrete location that includes a measurement accuracy (e.g., ±2 ft from the discrete location). The accuracy measure may be associate with a single location measurement or a series of measurements for the location the buried object.

A tolerance for the measurement that is considered acceptable may vary based on a type of job for which the locator 100 is used. For example, loose tolerances (e.g., ±5 ft) may be acceptable for jobs that do not require precise coordinates for digging (e.g., digging around a CATV line), while tighter tolerances (e.g., ±1 ft) may be preferable for precise digs (e.g., digging around a gas line). In one embodiment, the acceptable tolerance may be entered by the user using the handheld interface 214. In other embodiments, the user selects the type of object being detected and an acceptable tolerance associated with the selected object type is used by the accuracy determination module 254. Other techniques for specifying the acceptable tolerance may be used.

The user is notified when the accuracy measure for the global coordinates falls outside the acceptable tolerance for reporting the location of the buried object. The user may be notified in various ways depending on whether the current measurement is acceptable or unacceptable. For example, the user may be notified with a sound (e.g., an alarm) using the AUI 112 when the measurement falls outside of the acceptable tolerance range. In another example, an indicia of the location of the buried object is placed on a map and a visual attribute of the indicia is altered (e.g., flashing or color change) when the accuracy measure for the global coordinates exceeds a tolerance for reporting the location of the buried object. In addition, the handheld device 102 may stop collecting data and/or logging data in the data store when the current measurement of the location of the buried object 101 falls outside of the acceptable tolerance range.

A storage module 256 collects data from at least one of the data acquisition module 250, the location determination module 252, the accuracy determination module 254, the handheld interface 214, the camera 210, and the GPS module 212. The collected data may be referred to hereinafter as a "data set." The storage module 256 stores the data sets in the data store 206. The storage module 256 may store a single data set in the data store 206 when the user selects "Log Single Point" in the handheld interface 214. The storage module 256 may continuously store data sets in the data store 206 when the user selects "Start Continuous" in the handheld interface 214. In other words, the storage module 256 may store a data set in data store 206 corresponding to each acquisition of data by the data acquisition module 250. The storage module 256 may store data sets in the data store 206 so that the data sets may be retrieved based on the time the data set was stored.

The storage module 256 stores the accuracy measure associated with each set of data. The storage module may also store a binary indicator whether the accuracy measure falls within the acceptable tolerance range (i.e., 0=outside tolerance; 1=within tolerance).

A data retrieval module 258 retrieves data sets from the data store 206 based on a user request. The data retrieval module 258 may transfer the data sets to the cellular transceiver module 208 in order to transfer the data sets to the remote reporting system 104. In some implementations, the handheld device 102 streams the data to the remote reporting system 104 using the cellular network 106 and/or other wireless connection. When a connection using the cellular network 106 and/or other wireless connection is interrupted, the handheld device 102 may notify the user, cache the data for future transmission, and attempt to re-establish the connection. The handheld device 102 transmits the cached data when the connection is re-established.

In order to display the data on the handheld interface 214, the data retrieval module 258 may transfer the data sets to the mapping module 260. The mapping module 260 plots an indicia of the location of the buried object on a map using the global coordinates for the buried object.

Figure 6:
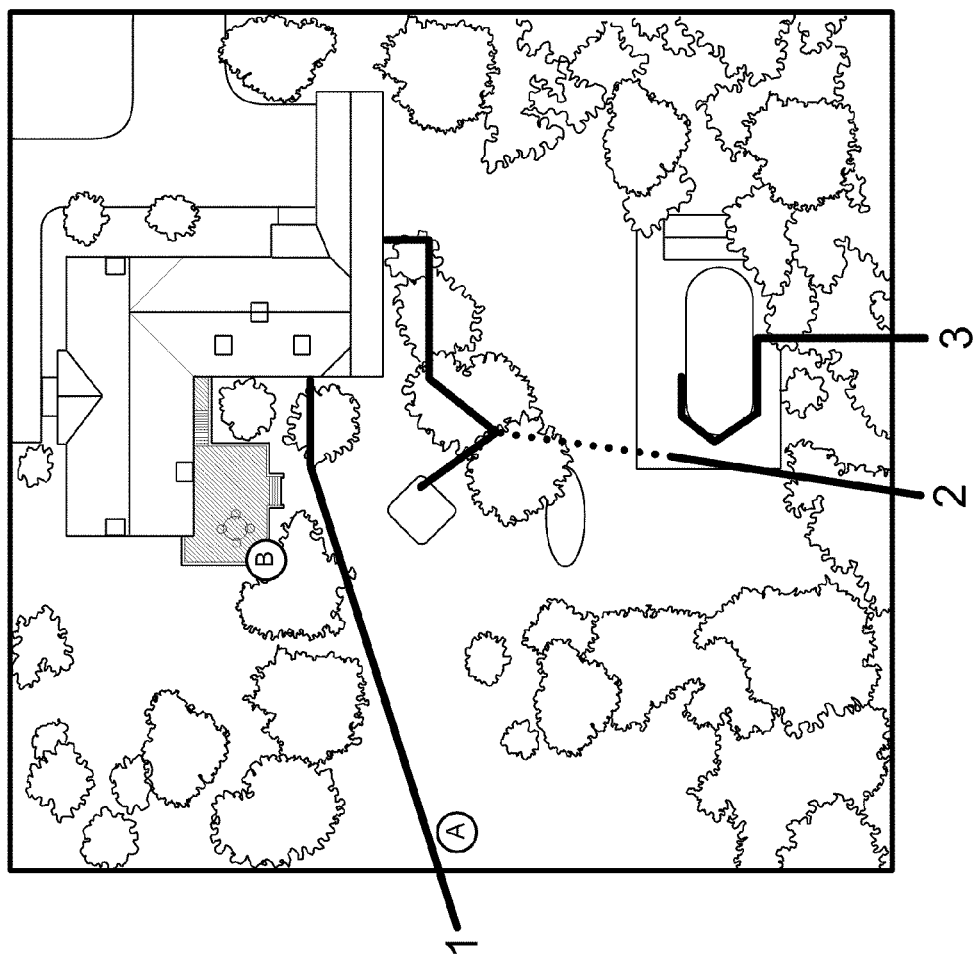
FIG. 6 illustrates an exemplary map generated based on data logged by the handheld device according to the present disclosure.

FIG. 6 shows an exemplary map based on data sets stored during a continuous data sampling operation. The map in FIG. 6 shows an aerial view of a house on a corresponding lot of land. The exemplary map shown in FIG. 6 may be generated at the access device 108 and/or on a display of the handheld interface 214 by overlaying the data sets on a map. Three traces (1-3) indicate buried objects. For example only, traces 1 and 2 may indicate buried electrical utilities, while trace 3 indicates a buried water utility. Each of the traces 1-3 may be color coded to indicate the utility represented.

The pattern of the traces may also indicate the accuracy of the associated measurement. For example, a solid trace may indicate that the accuracy of the measurement was within an acceptable tolerance range. A dotted trace may indicate that the accuracy of the corresponding measurement was outside of the acceptable tolerance range. For example, trace 2 includes a dotted portion that indicates that the measurement has an accuracy that falls outside an acceptable tolerance. Alternatively, the accuracy of the measurement in relation to the tolerance may be indicated by the thickness of the line, the color of the line or some other visual attribute associated with the line.

The map of FIG. 6 also shows two discrete data points A and B. Data points A and B may be associated with locations of interest noted by the user who took the measurements. For example, A may indicate an electrical utility box, while B may mark a corner of the house. Other points of interest may include a cleanout, fire hydrants, man holes or other object visible above ground. The user who took the measurements may have input notes (e.g., typed or voice recorded) into the handheld interface 214 indicating a significance of points A and B for future reference. The notes associated with points A and B may be retrieved by future users.

After finding a point of interest at a jobsite, the user may proceed with the determination of locations of concealed objects at the jobsite. Location data for any detected object may be reported in relation to the point of interest. Location of the point of the interest may also be used to more precisely plot the detected objects on a map.

Assuming the user has located an underground utility at the jobsite using the locator 100, the user may stand over the underground utility and attempt to acquire a clean signal using the locator 100 based on visual information on the locator interface 152. The user may then select "Log Single Point" in order to log a single set of data describing the location of the underground utility. When the user selects "Log Single Point", the handheld device 102 requests the locator data from the locator 100, the GPS data from the GPS device 114, and any other data from devices linked to the handheld device 102 (e.g., a camera). The handheld device 102 acquires the GPS data, the locator data, and any other data, then determines a tolerance associated with the data. The handheld device 102 then determines a GPS coordinate of the underground utility based on the locator data, the GPS data, and the accuracy measure associated with the data. The handheld device 102 then stores the GPS coordinate and associated accuracy measure in data store 206 along with the time the GPS data was acquired.

In some implementations, the user may choose to log the GPS coordinates using only the GPS module 212 of the handheld device 102. For example, the user may take a picture of the point of interest using the camera 210 and the link application module 204 may then store the handheld image data from the camera 210, the corresponding GPS coordinates, and an accuracy measure associated with the measurement of the GPS module 212 in the data store 206. The picture, corresponding GPS coordinates, and accuracy measure may then be included in a report that includes other data relating to the location of the point of interest.

Alternatively, the user may select "Start Continuous" in order to log multiple sets of data describing the location of the underground utility. When the user selects "Start Continuous", the handheld device 102 continuously requests (e.g., at a predetermined sample rate) the locator data from the locator 100, the GPS data from the GPS device 114, and any other data from devices linked to the handheld device 102 (e.g., a camera). Accordingly, the handheld device 102 continuously stores GPS coordinates and associated accuracy measures in data store 206 along with the times the GPS data was acquired.

The user may trace the underground utility based on feedback from the GPS device 114 and the locator 100 displayed on the handheld interface 214. The user may also trace the underground utility based on feedback from the locator interface 152. For example, the user may monitor the locator interface 152 in order to attempt to maximize an accuracy of the locator 100 by standing directly over the underground utility. Additionally, the user may monitor the accuracy associated with current measurements in real-time on the handheld interface 214 to determine whether the measurements being logged are within an acceptable tolerance. The user deactivate the "Start Continuous" mode when the user is finished taking data. The user may then view the data on the handheld interface 214 using a mapping application. The user may also transfer the data to the remote reporting system 104 so the access device 108 may retrieve the data to generate a report. For example, the report generated based on the data taken at the jobsite indicates the location of various points of interest, buried objects, and associated measurement tolerances.

Figure 7:
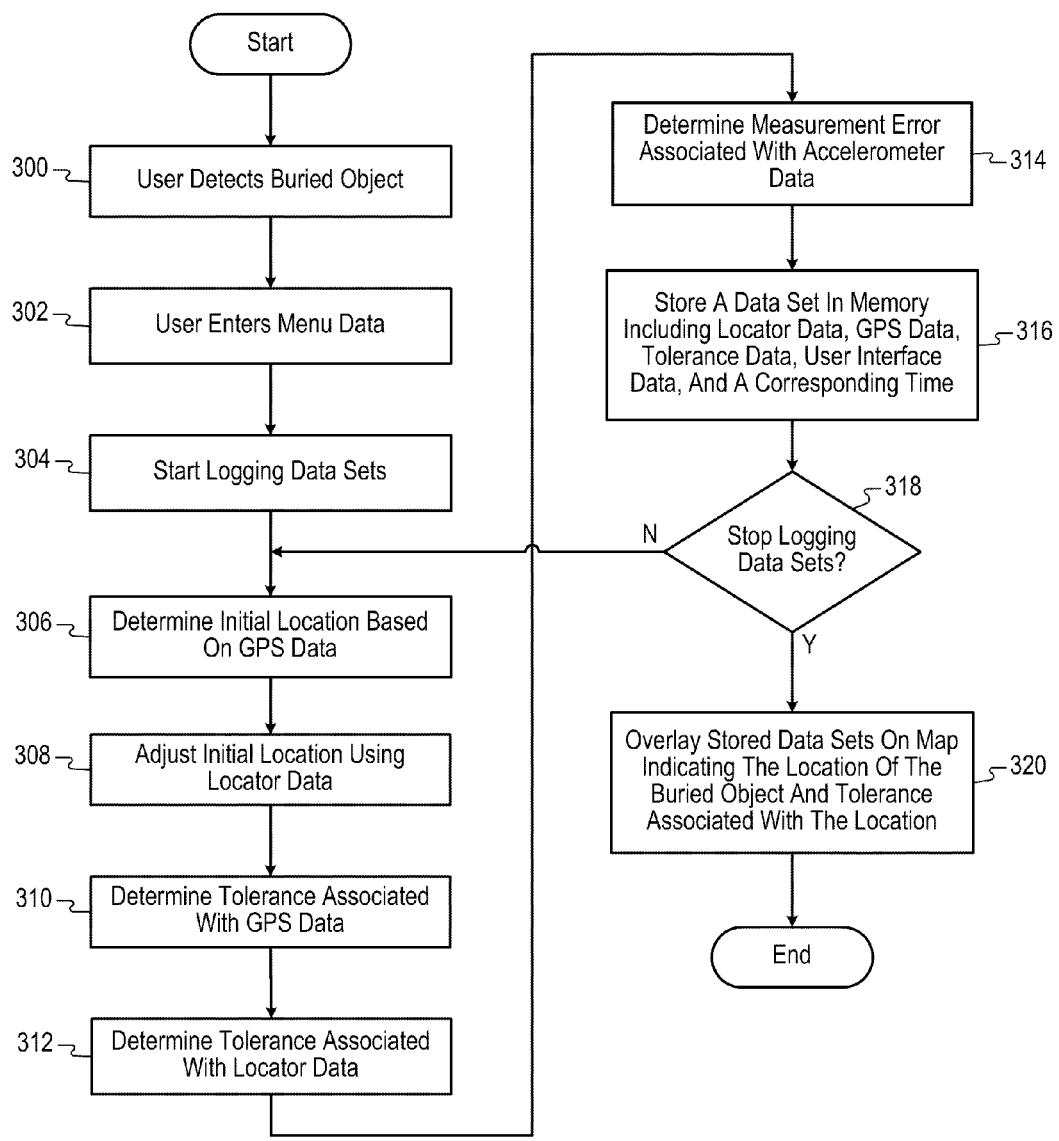
FIG. 7 illustrates a method for determining a location of a buried object and displaying the location on a map according to the present disclosure.

Referring now to FIG. 7, a method for determining a location of a buried object and displaying the location on a map starts at 300. At 300, a user detects the buried object 101. At 302, the user enters user interface data into the handheld interface 214. At 304, the user initiates logging of data, for example, by selecting "Start Continuous" in the handheld interface 214.

At 306, the location determination module 252 determines an initial location of the buried object 101 based on GPS data. At 308, the location determination module 252 adjusts the initial location using locator data. At 310, the accuracy determination module 254 determines an accuracy associated with the GPS data. At 312, the accuracy determination module 254 determines an accuracy associated with the locator data. At 314, the accuracy determination module 254 determines an spatial orientation of the locator using data from the accelerometer. At 316, the storage module 256 stores a data set in the data store 206 that includes locator data, GPS data, accuracy data, user interface data, and a time corresponding to the determination of the location of the buried object 101.

At 318, the data acquisition module 250 determines whether to stop logging data sets, for example, based on whether the user has de-selected "Start Continuous" on the handheld interface 214. If false, the method continues at 306. If true, the method continues at 320. At 320, the access device 108, in response to a command from a user, overlays the stored data sets on a map that indicates the location of the buried object 101 and a tolerance associated with the location.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

What is claimed is:

1. A method for reporting location of a buried object detected by a utility locator device, comprising:
    determining location of a buried object using electromagnetic field emissions emitted from a utility locator device;
    determining global coordinates for the locator using a global positioning system (GPS);
    adjusting the global coordinates for the locator using the location of the buried object as reported by the locator device to derive global coordinates for the location of the buried object;

determining an accuracy measure for the global coordinates for the location of the buried object; and notifying an operator of the locator when the accuracy measure for the global coordinates exceeds a tolerance for reporting the location of the buried object.

2. The method of claim 1 further comprises receiving an input indicative of the tolerance from the operator of the locator.

3. The method of claim 1 further comprises logging global coordinates for the location of the buried object, along with the accuracy measure, in a data store, and discontinuing logging of global coordinates when the accuracy measure for the global coordinates exceeds a tolerance for reporting the location of the buried object.

4. The method of claim 1 wherein notifying an operator further comprises emitting an audible indicator when the accuracy measure for the global coordinates exceeds a tolerance for reporting the location of the buried object.

5. The method of claim 1 further comprises:
receiving an accuracy associated with the location of the buried object;
receiving an accuracy associated with the global coordinates for the locator from the GPS; and
determining an accuracy measure for the global coordinates for the location of the buried object from the accuracy associated with the location of the buried object further and the accuracy associated with the global coordinates for the locator.

6. The method of claim 5 further comprises determining a spatial orientation of the locator using an accelerometer and adjusting the accuracy measure for the global coordinates using the spatial orientation of the locator.

7. A method for reporting location of a buried object detected by a utility locator device, comprising:
determining location of a buried object using electromagnetic field emissions emitted from a utility locator device, where the location of the buried object having an accuracy associated therewith;
determining global coordinates for the location of the buried object using a global positioning system (GPS), where the global coordinates having an accuracy associated therewith;
determining an accuracy measure for the global coordinates using the accuracy of the location determined by the locator and the accuracy of the GPS; and
reporting the global coordinates for the buried object, along with the accuracy measure, to an operator of the utility locator device.

8. The method of claim 7 wherein determining global coordinates for the location of the buried object further comprises determining global coordinates for the locator and adjusting the global coordinates for the locator using the location of the buried object reported by the locator to derive the global coordinates for the location of the buried object.

9. The method of claim 7 further comprises plotting an indicia of the location of the buried object on a map using the global coordinates for the buried object.

10. The method of claim 9 further comprises altering a visual attribute of the indicia when the accuracy measure for the global coordinates exceeds a tolerance for reporting the location of the buried object.

11. The method of claim 7 further comprises emitting an audible indicator when the accuracy measure for the global coordinates exceeds a tolerance for reporting the location of the buried object.

12. The method of claim 7 further comprises determining a spatial orientation of the locator using an accelerometer and adjusting the accuracy measure for the global coordinates using the spatial orientation of the locator.

13. The method of claim 7 further comprises logging global coordinates for the location of the buried object, along with the accuracy measure, in a data store, and discontinuing logging of global coordinates when the accuracy measure for the global coordinates exceeds a tolerance for reporting the location of the buried object.

14. A system for reporting location of a buried object detected by a portable locator device, comprising:
a portable locator device that detects location of an object using electromagnetic field emissions and reports the location of the object, along with an accuracy measure for the location;
a global positioning system (GPS) affixed in relation to the locator and operable to report global coordinates for the locator, along with an accuracy measure for the global coordinates; and
a link application configured to receive the location of the object from the locator and the global coordinates for the locator and adjust the global coordinates for the locator using the location of the buried object reported by the locator to derive global coordinates for the location of the buried object,
the link application further configured to determine an accuracy measure for the global coordinates for the location of the buried object using the accuracy measure for the location and the accuracy measure for the global coordinates for the locator.

15. The system of claim 14 wherein the link application resides in a handheld computing device, the handheld computing device having a wireless transceiver in data communication over a wireless communication link with the locator.

16. The system of claim 15 wherein the link application logs the global coordinates for the location of the buried object, along with the accuracy measure, in a data store of the handheld computing device, and discontinues logging the global coordinates when the accuracy measure for the global coordinates exceeds a tolerance for reporting the location of the buried object.

17. The system of claim 15 wherein the link application plots an indicia of the location of the buried object on a map using the global coordinates for the buried object and displays the map of a display of the handheld computing device.

18. The system of claim 15 wherein the link application triggers an audible indicator output by the handheld computing device when the accuracy measure for the global coordinates exceeds a tolerance for reporting the location of the buried object.

19. The system of claim of claim 14 further comprises an accelerometer integrated into a housing of the locator, where in the link application determines a spatial orientation of the locator from measurement data received from the accelerometer and adjusts the accuracy measure for the global coordinates using the spatial orientation of the locator.

20. The system of claim 14 wherein the GPS is integrated into a housing of the locator.

21. The system of claim 14 wherein the GPS resides in the handheld computing device, such that the handheld computing device detachably couples to the locator.

22. The system of claim 14 wherein the GPS and the link application resides in a housing of the locator.

23. The system of claim 22 wherein the link application plots an indicia of the location of the buried object on a map using the global coordinates for the buried object and displays the map of a display of the locator.

24. The system of claim 22 wherein the link application triggers an audible indicator output by the locator when the accuracy measure for the global coordinates exceeds a tolerance for reporting the location of the buried object.

* * * * *